US012643637B2

(12) United States Patent
Dunseth

(10) Patent No.: US 12,643,637 B2
(45) Date of Patent: Jun. 2, 2026

(54) MOTION RESTRICTOR DEVICE AND SYSTEM FOR OFFSHORE LOADING

(71) Applicant: APL Norway AS, Kolbjørnsvik (NO)

(72) Inventor: Erik Dunseth, Færvik (NO)

(73) Assignee: APL Norway AS, Kolbjørnsvik (NO)

(*) Notice: Subject to any disclaimer, the term of this patent is extended or adjusted under 35 U.S.C. 154(b) by 133 days.

(21) Appl. No.: 18/240,056

(22) Filed: Aug. 30, 2023

(65) Prior Publication Data

US 2024/0076014 A1 Mar. 7, 2024

(30) Foreign Application Priority Data

Sep. 1, 2022 (NO) .................................... 20220943

(51) Int. Cl.
*B63B 27/24* (2006.01)
*B63B 27/34* (2006.01)
*B67D 9/00* (2010.01)

(52) U.S. Cl.
CPC .............. *B63B 27/24* (2013.01); *B63B 27/34* (2013.01); *B67D 9/00* (2013.01)

(58) Field of Classification Search
CPC ......... B63B 27/24; B63B 27/34; B63B 27/25; B63B 21/16; B67D 9/00; B67D 9/02; F16L 33/00; F17C 2270/0105
USPC .......................................................... 141/388
See application file for complete search history.

(56) References Cited

U.S. PATENT DOCUMENTS 3,249,121 A * 5/1966 Bily ......................... B67D 9/02 285/24
5,064,329 A * 11/1991 Brenna .................... B67D 9/00 414/137.7
5,509,838 A * 4/1996 Breivik ................. B63B 22/026 114/230.1
6,886,611 B2 * 5/2005 Dupont .................... B67D 9/00 414/139.4
8,181,662 B2 * 5/2012 Pollack ................... B63B 27/34 137/15.08
8,296,914 B2 * 10/2012 Dupont .................... B67D 9/00 414/138.2

(Continued)

FOREIGN PATENT DOCUMENTS

GB 2 240 534 A 8/1991
KR 102271081 B1 * 6/2021

(Continued)

OTHER PUBLICATIONS

NO-176240-B English Translation of Specification (Year: 2025).*

(Continued)

*Primary Examiner* — Kenneth Rinehart
*Assistant Examiner* — Stephanie A Shrieves
(74) *Attorney, Agent, or Firm* — Leydig, Voit & Mayer, Ltd.

(57) ABSTRACT

A motion restrictor device and system for an offshore loading arrangement is described, wherein the motion restrictor device comprises a first portion, at least two second portions protruding from opposite sides of the first portion, and a restrictive surface on the outside of the first portion, wherein the at least two second portions each comprise a protrusion at least partly extending form restriction areas between each respective two second portion and at least parts of the restrictive surface, adapted to restrict horizontal movement of a bridle.

15 Claims, 5 Drawing Sheets

(56) References Cited

U.S. PATENT DOCUMENTS

| | | | | |
|---|---|---|---|---|
| 9,644,764 | B2 * | 5/2017 | Kelly | B67D 9/02 |
| 9,708,040 | B2 * | 7/2017 | Le Devehat | B67D 9/02 |
| 11,987,328 | B2 * | 5/2024 | Aunvik | B67D 9/00 |
| 2015/0247599 | A1 * | 9/2015 | Hovik | F16L 37/1205<br>285/27 |
| 2019/0283844 | A1 * | 9/2019 | Albrigtsen | B63B 27/34 |

FOREIGN PATENT DOCUMENTS

| | | | | |
|---|---|---|---|---|
| NO | 176240 | B | * | 11/1994 |
| NO | 342287 | B1 | | 4/2018 |
| NO | 346250 | B1 | | 5/2022 |
| WO | WO 93/13976 | A1 | | 7/1993 |
| WO | WO 2010/137990 | A1 | | 12/2010 |
| WO | WO 2018/015311 | A1 | | 1/2018 |

OTHER PUBLICATIONS

Great Britain Intellectual Property Office, Search and Examination Report issued in counterpart GB Application No. 2312635.2, mailed on Feb. 1, 2024.

Norwegian Patent Office, Norwegian Search Report in Norwegian Application No. 20220943, dated Nov. 22, 2022.

* cited by examiner

MOTION RESTRICTOR DEVICE AND SYSTEM FOR OFFSHORE LOADING

CROSS-REFERENCE TO RELATED APPLICATIONS

This patent application claims the benefit of Norwegian Patent Application No. 20220943, filed Sep. 1, 2022, which is incorporated by reference.

TECHNICAL FIELD

The present invention relates to a device, system and method for restriction of relative movement between couplings at sea, such as for establishing a connection for unloading or loading between vessels or offshore installations, such as fixed, floating, or submerged installations.

BACKGROUND OF THE INVENTION

Loading and unloading of fluids and hydrocarbons, such as oil and gas, and power to and from installations at sea is strongly limited by the weather and environmental conditions.

A commonly used and well proven technology for transferring hydrocarbons such as oil or condensate from a Floating Production, Offloading and Storage (FPSO) vessel or a Floating Storage and Offloading (FSO) vessel to an Export Tanker is by using a bow loading system at the bow of the Export tanker. In this arrangement the FPSO/FSO is equipped with a loading station comprising a loading hose and a mooring hawser, or only a loading hose. In the connection process the loose end of the hose is transferred and connected to the Export Tanker—the other end is connected to the FPSO/FSO. Same is also done with the mooring hawser. This arrangement is affectable to bad weather and rough sea, as the movement of the hose when it is in the process of being connected to the bow loading system can damage the equipment and vessel.

Prior art includes Norwegian patent NO 346250 B1 which discloses a multidirectional turret loading system for loading/unloading of fluid between an offshore installation and a vessel. Document NO 342287 describes a coupling system, a transfer system and a method for fluid transfer between a bow area of an elongated vessel and a hydrocarbon delivery installation at open sea. The coupling system comprising a support frame for suspending the coupling system to the vessel and a fluid receiving tube segment fixed to the support frame comprising a coupling device arranged at a first end of the tube segment and configured to establish a leakage free coupling with a hose valve. The coupling system further comprises a remotely controlled drive system configured to simultaneously exert a transverse force generating pendulum movements of the coupling device in the transverse plane, the transverse plane being defined as a plane oriented transverse the vessel and along the vessels height when the coupling system is assembled to the bow area of the vessel, and a longitudinal force generating pendulum movements of the coupling device in a longitudinal plane, the longitudinal plane being defined as the plane oriented longitudinal the vessel and along the vessels height when the coupling system is assembled to the bow area of the vessel.

NO 176240 A describes a loading arrangement for loading of fluids in a vessel at sea. The loading arrangement includes a coupling manifold on board the vessel; a coupling part associated with the coupling manifold, a loading hose with a coupling head for coupling with said coupling part for providing a fluid flow connection between loading hose and coupling manifold, a bearing for the coupling manifold to swing about a horizontal axis and a device for causing the coupling frame to swing about the horizontal axis. The coupling part is suspended in the coupling frame in a spherical suspension, and in an actuating device is provided between the coupling manifold and the coupling part for pivoting the coupling member in all planes on the spherical suspension.

During bad weather, such as strong winds or rough seas, the vessel will roll and pitch, which causes both transverse and relative motion between the coupling head of the transfer hose and the coupling part of the vessel. This relative motion can damage both the coupling head and the coupling part, rendering the connection arrangement unfit for a thigh connection, and the transfer operation must be aborted. Previous know systems, such as the once disclosed herein as prior art, can handle a maximum significant wave height (Hs) of 4.5 meters.

It is therefore an aim of the invention to provide a device, system and method which allows connection and transfer at sea with a higher significant wave height than the known solutions.

It is further an aim of the present invention to overcome the drawbacks of the prior art.

It is a further aim of the present invention to be able to extend the operational window in respect to harsh weather conditions and make use of narrow weather windows by restriction of movement of the connection means, such as riser, during connection of a loading or unloading conduit to vessels to the installations holding liquid/gases and power.

BRIEF SUMMARY OF THE INVENTION

The invention is set forth and characterized in the main claims, while the dependent claims describe other characteristics of the invention.

In a first aspect of the invention there is provided a motion restrictor device adapted for an offshore loading system, wherein the motion restrictor device comprises a first portion, and at least two second portions protruding from opposite sides of the first portion, wherein the first portion comprises a first end and a second end and an substantially arched or angled shape adapted to be at least party encompassing the loading system, or parts thereof, and a restrictive surface on the outside of the first portion, wherein the at least two second portions comprises a protrusion that may at least partly extending in a direction forwards, for instance forwards of a line perpendicular to a centerline, to form restriction areas comprised of the areas between each respective two second portion and at least parts of the restrictive surface, adapted to restrict horizontal movement of a bridle.

In an embodiment of the first aspect, the motion restrictor device further comprises at an actuator arrangement adapted to move the motion restrictor device perpendicular relative to an axis, between a retracted position and an advanced position.

In another embodiment of the first aspect, the actuator arrangement comprises at least one actuator adapted to be connected to the motion restrictor device and to a loading system, or parts thereof, a coupling manifold or parts thereof, or a part of a vessel.

In yet another embodiment of the first aspect, the motion restrictor device further comprises a first extendable member pivotably attached to a first side of the motion restrictor device, and a second extendable member pivotably attached to a second side of the motion restrictor device, and a first actuator and a second actuator. A first end of the first actuator is adapted to be pivotably attached to a loading system, or parts thereof, and a second end of the first actuator is pivotably attached to a first side of the motion restrictor device or to the first extendable member, and the second actuator is adapted to be pivotably attached to the loading system, or parts thereof, and a second end of the second actuator is pivotably attached to a second side of the motion restrictor device or to the second extendable member.

In yet another embodiment of the first aspect, the first portion comprises a frontmost end at a centerline, and extends backwards and outwards to both sides of the centerline towards a back end comprising the first side and second side, to form the arched or angled shape.

In yet another embodiment of the first aspect, the second portions protrudes from either side of the centerline and may form a bullhorn shape.

In a second aspect of the invention, it is provided a load arrangement for connection fluid hoses and/or power cables to or from a vessel, the arrangement comprises a loading system and a motion restrictor device according to the first aspect of the invention associated with the loading system and being adapted to restrict horizontal movement of hose bridles.

In an embodiment of the second aspect, the bow loading system comprises a coupling manifold, a coupling part associated with the coupling manifold, a loading hose with a coupling head adapted to mate with the coupling part and at least a hose bridle adapted to hoist the coupling head into mating with the coupling part.

In another embodiment of the second aspect, the arrangement further comprises an actuator arrangement attached between the coupling manifold, or parts thereof, and the motion restrictor device, adapted to move the motion restrictor device perpendicular to an axis defined by at a center axis running through the coupling manifold for at least a portion, wherein the motion restrictor device is movable between a retracted position and an advanced position.

In yet another embodiment of the second aspect, the distance between the restrictive areas is greater than the distance between the two hose bridles.

In yet another embodiment of the second aspect, the coupling manifold comprises a first rotational means adapted to rotate the coupling manifold around a horizontal rotational axis, and a second rotational means adapted to articulate the coupling part, and wherein the motion restrictor device is situated around the coupling manifold or parts thereof between the first rotational means and the second rotational means.

In a third aspect of the invention, it is provided a method for restricting movement of a riser bridle during connection to a bow loading system according to the second aspect, wherein the method comprising the steps of:

a) hoisting a coupling head of a loading hose, via hose bridles, towards the coupling part, and;
b) position the motion restrictor device, by the actuator arrangement, into the advanced position, wherein the motion restrictor device contacts the hose bridle such that the first restrictor area restricts a first bridle and the second restrictor area restricts a second bridle, and:
c) position the coupling part, by articulating the first and/or the second rotational means, such that the coupling part and coupling head are in line, and;
d) position the motion restrictor device, by the actuator arrangement, into the retracted position, wherein the motion restrictor device is free of the hose bridle, and;
e) hoisting the coupling head, by hose bridles, until the coupling head contacts the coupling part.

In another embodiment of the third aspect, step c) and d) are performed in the opposite order.

BRIEF DESCRIPTION OF THE DRAWING(S)

Below, various embodiments of the invention will be described with reference to the figures, in which like numerals in different figures describes the same features.

DETAILED DESCRIPTION OF THE INVENTION

Figure 1:
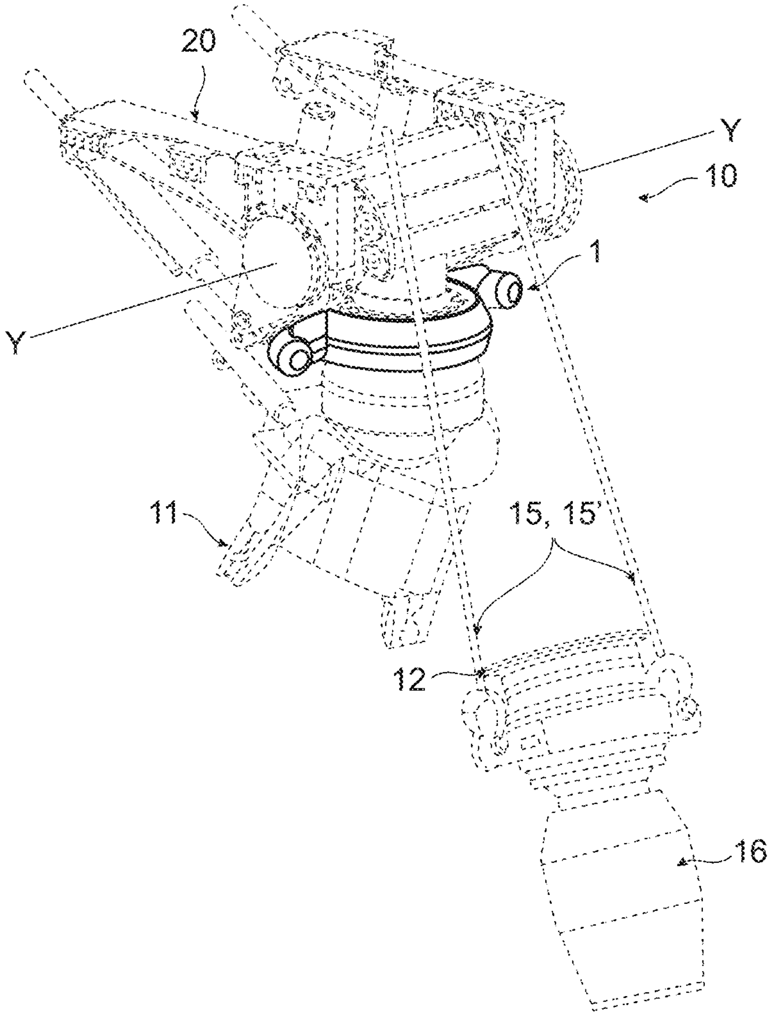
FIG. 1 illustrates a bow loading system and the motion restrictor device.

Embodiments herein will now be described more fully with reference to the accompanying drawings, in which example embodiments are shown. However, this application should not be construed as limited to the embodiments set forth herein. Disclosed features of example embodiments may be combined as readily understood by one of ordinary skill in the art to which this application belongs. The following description will use terms such as "horizontal", "vertical", "lateral", "back and forth", "up and down", "upper", "lower", "inner", "outer", "forward", "rear", etc. These terms generally refer to the views and orientations as shown in the drawings and that are associated with a normal use of the invention wherein the invention is part of a vessel arrangement. The terms are used for the reader's convenience only and shall not be limiting. Like numbers refer to like elements throughout. Numerals with apostrophe represents an additional feature represented by the same numeral. Well-known functions or constructions will not necessarily be described in detail for brevity and/or clarity.

FIG. 1 illustrates a bow loading system comprising a motion restrictor device 1. The illustrated bow loading system comprises a coupling manifold 10 movable arranged and a coupling part 11 extending from the coupling manifold 10. Typically, an offshore installation is equipped with a transfer hose 16, or transfer cable, comprising a coupling head 12 that is to be connected to a coupling part 11 forming part of another installation, such as a vessel. To connect the coupling head 12 to the coupling part 11, the transfer hose 16 is pulled from the offshore installation, towards the vessel (not shown) by means of a hose handling winch (not shown) and a hose handling rope, hereafter called a bridle 15, 15' until the coupling head 12 is in axial alignment with the coupling part 11. A bridle can be one or more wire, rope, cord or other suitable lifting member. The coupling head 12 is adapted to mate with the coupling part 11 with corresponding connection means in a leak free and thigh coupling. It should be understood that the invention may be used in conjunction with different types of loading system, and that it should not be restricted to the transfer of hydrocarbons. For instance, the invention disclosed herein may be used for connection of systems for transfer of liquid and/or gaseous hydrocarbons, hydrogen or ammonia as well as for connection of power cables.

The bow loading system illustrated in FIG. 1 comprises support frame 20 for suspending the coupling manifold 10 to the vessel (not shows). The coupling manifold 10 comprises a receiving tube segment 21 that is coupled to the coupling part 11. The support frame 20 and coupling manifold 10 is rotationally linked through a first rotational means 13 adapted to rotate the coupling manifold 10 around a horizontal rotational axis (Y). The coupling manifold 10 is thus pivotably attached, via the first rotational means 13, to the bow of the vessel, or parts thereof, via a support frame 20. The coupling manifold 10 further comprises a second rotational means 14 adapted to articulate the coupling part 11. In the illustrated embodiment, the second rotational means 14 is located on the receiving tube segment 21. The second rotational means 14 may comprise a drive system 23 comprising at least one or more separately controlled drive units configured to exert a transverse-, longitudinal- and/or a rotational force generating pendulum movements of the coupling part 11, to achieve axial alignment between the coupling part 11 and coupling head. Furthermore, the second rotational means 14 may be a ball joint or cardan joint.

In FIG. 1, the motion restrictor device 1 is situated partly encompassing the receiving tube segment 21 of the coupling manifold 10 between the first rotational means 13 and the second rotational means 14, such that movement of the first rotational means 13 affects the position of the motion restrictor device 1 relative to the vessel but not the position relative to coupling part 11. Movement of the second rotational means 14 affects the position coupling part 11 relative of the motion restrictor device 1 and to the coupling head 12.

Figure 2:
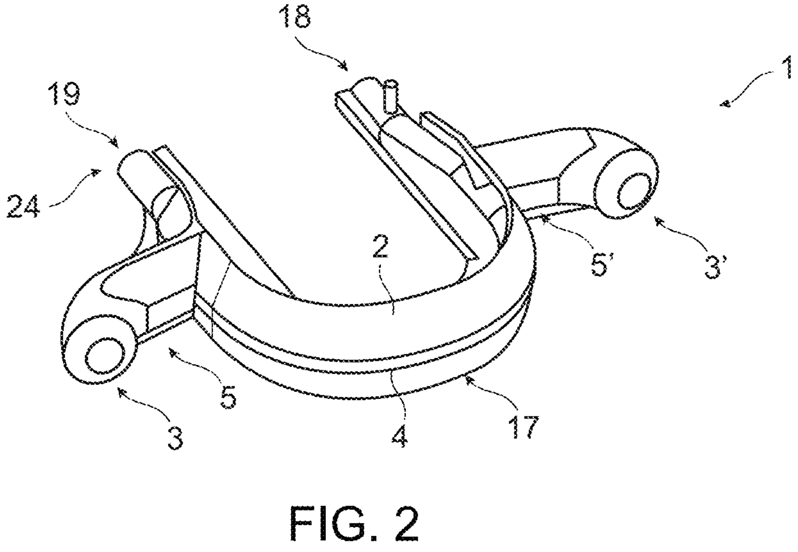
FIG. 2 illustrates the motion restrictor device.

FIG. 2 illustrates an isolated view of the motion restrictor device 1, which comprises a first portion 2, and two second portions 3, 3' protruding from opposite sides of the first portion 2. The first portion 2 comprises a restrictive surface 4 on the outside of the first portion 2 between the two second portions 3, 3' adapted to receive the bridles 15, 15'. The first portion 2 comprises a frontmost end 17, when seen from above and wherein the frontmost end is in the connection direction of a vessel, wherein the frontmost end 17 is located on the centerline, and extends backwards and outwards from the centerline towards the back end 24 comprising a first side 18 and second side 19, to form the arched or angled shape, such as a U shape or V shape adapted to be at least party encompassing the bow loading system or parts thereof. The motion restriction is achieved by the bridles 15, 15' being forced apart by the shape of the first portion 2 when the motion restrictor device 1 receives two bridles 15, 15'.

Furthermore, the at least two second portions 3, 3' comprises a protrusion at least partly extending in a direction forward of perpendicular to a centerline to form restriction areas 5, 5' comprised of an area between each respective two second portion 3, 3' and at least parts of the restrictive surface 4, adapted to restrict horizontal movement of a riser bridle 15, 15'. The second portions 3, 3' protrudes from either side of the centerline and may form a bullhorn shape. The motion restrictor device 1 may form a restrictive surface 4 that, when seen from above, comprises two surfaces extending backwards and outwards from a frontmost end and further forward and outwards, such that two ropes, or bridles 15, 15' each can be restricted from backwards and sideways movement when the motion restrictor device 1 engages the bridles 15, 15'.

The centerline is readily known as a line of symmetry between the port and starboard sides of any vertical section or any horizontal section. For instance the middle line of the vessel extending from stem to stern at any level. It should be understood that if the loading system or device is not mounted or attached to the bow portion of a vessel, the centerline should be understood as the line running straight through a vertical plane intersecting the frontmost end 17 of the motion restrictor device 1 and/or system in symmetry between the outmost horizontal portions.

Figure 3:
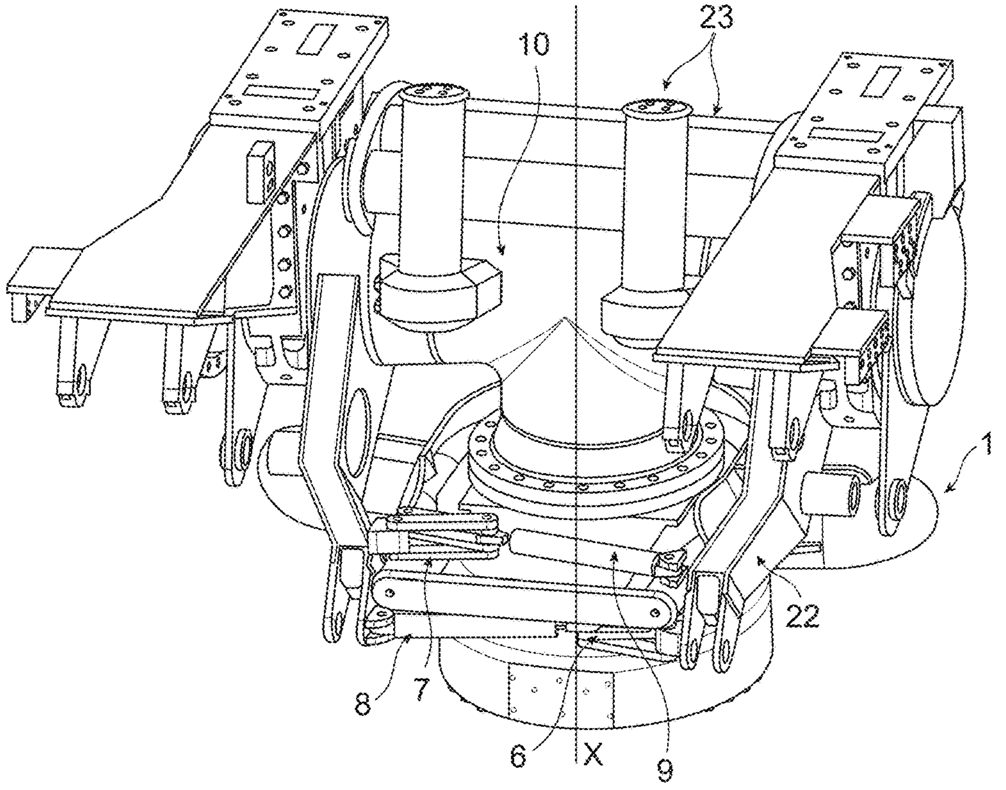
FIG. 3 illustrates parts of bow loading system and the motion restrictor device in the retracted position as seen from the back.

The arrangement illustrated in FIG. 3 comprises an actuator arrangement 6, 7, 8, 9 attached between the coupling manifold 10, or parts thereof, and the motion restrictor device 1, adapted to move the motion restrictor device 1 perpendicular to an axis X defined by at a centre axis running through at least a part of the coupling manifold 10 at the horizontal position where the motion restrictor device 1 encompasses the coupling manifold 10, or parts thereof. The motion restrictor device 1 is movable between a retracted position and an advanced position. In the retracted position, as disclosed in FIG. 3, the motion restrictor device 1 is at least partly surrounding the coupling manifold 10, such as the receiving tube segment 21 or parts of the second rotational means 14. In the advanced position, as disclosed in FIG. 4, the motion restrictor device 1 is moved in a translational direction in relation to retracted position and the part of the coupling manifold 10 the device is encompassing.

Figure 4:
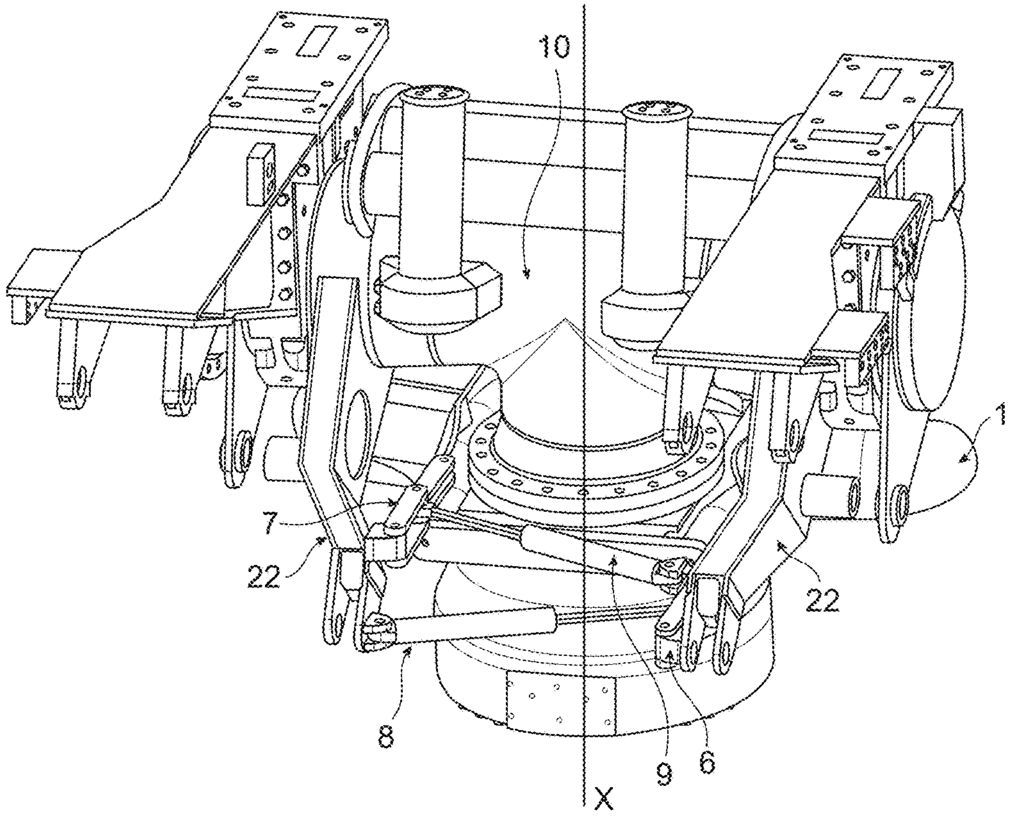
FIG. 4 illustrates parts of bow loading system and the motion restrictor device in the advanced position as seen from the back.

In FIGS. 3 and 4 the actuator arrangement comprises a first extendable member 6 pivotably attached to a first side 18 of the motion restrictor device 1, and a second extendable member 7 pivotably attached to a second side 19 of the motion restrictor device 1. The first and second extendable members 6, 7 are further pivotably attached to a frame part 22 protruding from the coupling manifold 10. A first end of the first actuator 8 and the first end of the second actuator 9 is pivotably attached the frame part 22, and a second end of the first actuator 8 is pivotably attached to the first extendable member 6 and a second end of the second actuator 9 is pivotably attached to the second extendable member 7. An actuation of the actuators 8, 9 i.e. extending the actuator from an initial position to an extended position, will extend the extendable members 6, 7 and thus move the motion restrictor device 1 into the advanced position. In another embodiment, a single actuator or a first and second actuators 8, 9 or multiple actuators can be used, and the at least one actuator 8, 9 can in a first end be pivotably or fixedly attached to coupling manifold 10 or parts thereof, such as the frame part 22, and in a second end be pivotably or fixedly attached to the motion restrictor device 1, such as the first side 18 or second side of the back end.

Figure 5:
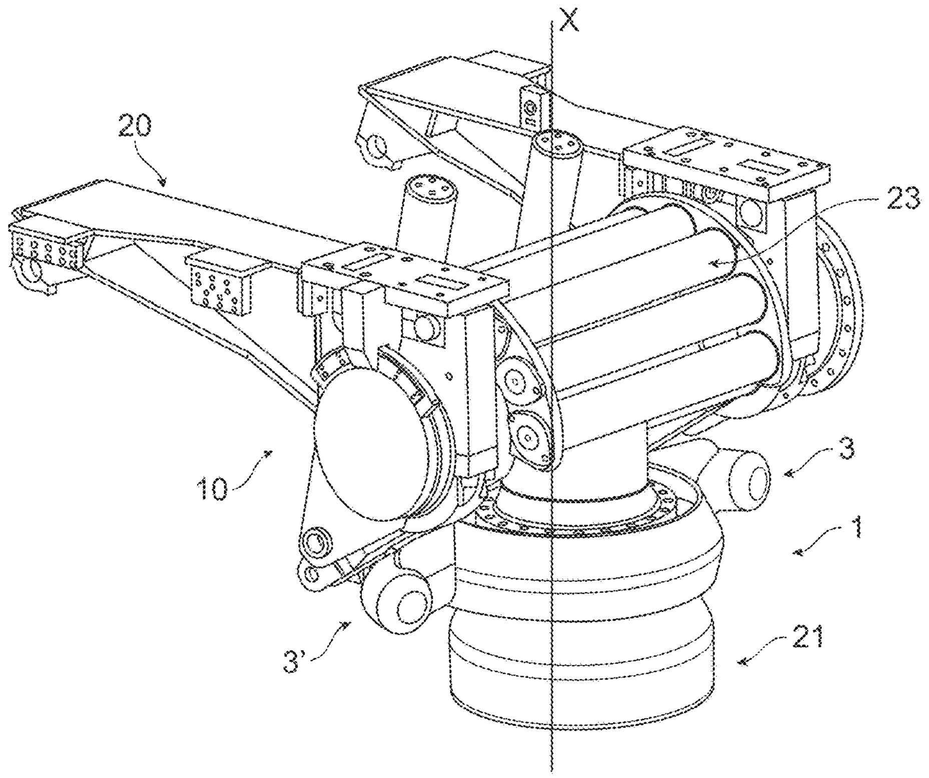
FIG. 5 illustrates parts of bow loading system and the motion restrictor device in the retracted position as seen from a slanted side view.
Figure 6:
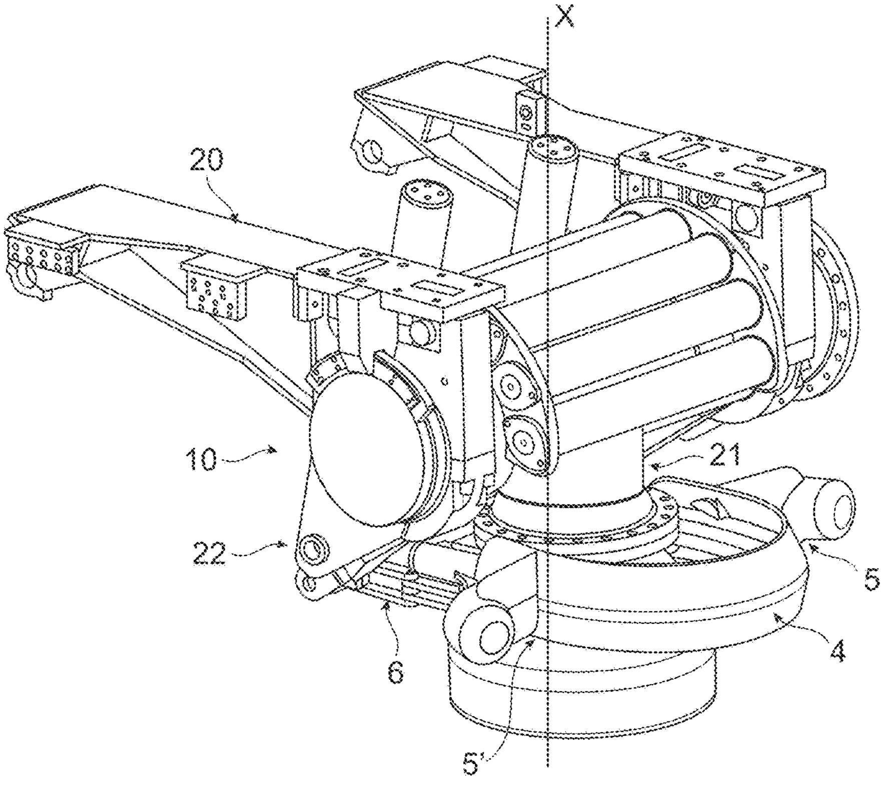
FIG. 6 illustrates parts of bow loading system and the motion restrictor device in the advanced position as seen from a slanted side view.

FIGS. 5 and 6 illustrates the motion restrictor device 1 seen from a forward view. In FIG. 5 the motion restrictor device 1 is in its retracted position and in FIG. 5 the motion restrictor device 1 is in its advanced position, and the first and second extendable members 6, 7 have been extended by the actuators 8, 9.

Figure 7:
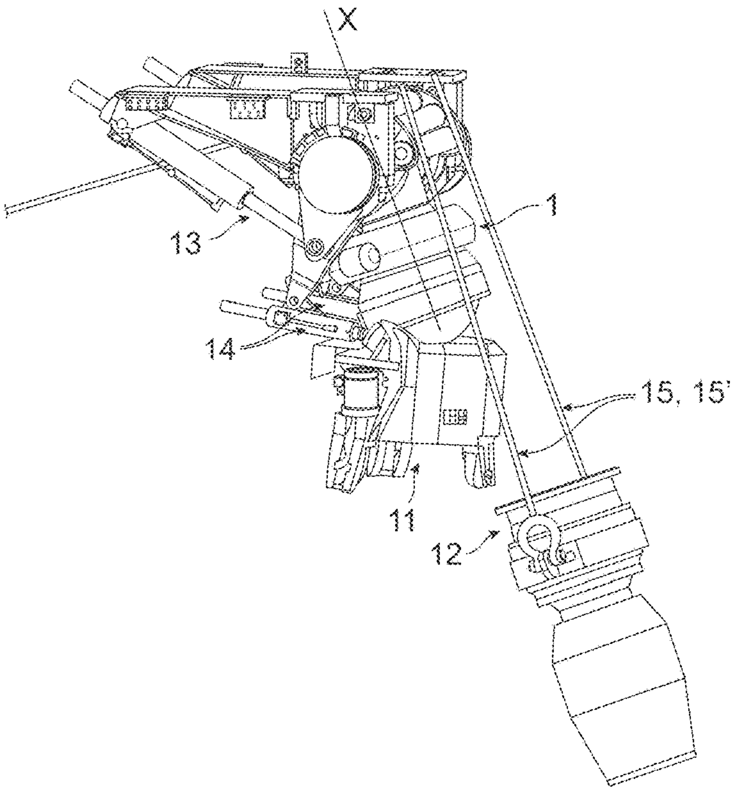
FIG. 7 illustrates a bow loading system and the motion restrictor device in the retracted position as seen from the side.

FIG. 7 illustrates an initial face of a connection operation, wherein a transfer hose 16 comprising the coupling head 12 is lifted, or hoisted, by a winch (not shown) on board the vessel (not shown). A set of sheaves or rollers 23 above the coupling manifold 10 changes the direction of motion of the bridles 15, 15' from horizontal (on the vessel) to almost vertical, so the coupling head 12 is pulled towards the coupling part 11. In at this stage, the motion restrictor device 1 is in the retracted position and does not engage the bridles 15, 15'.

Figure 8:
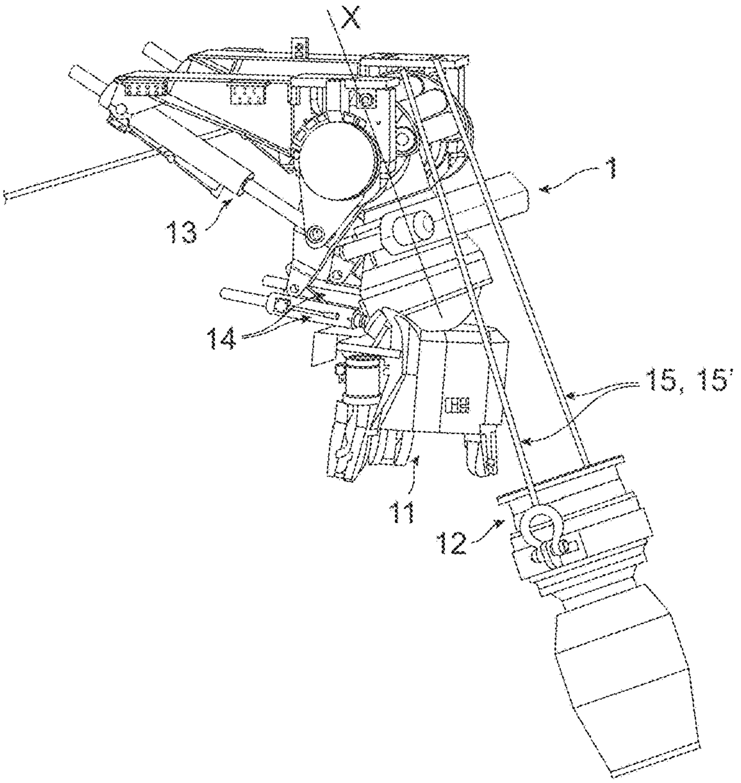
FIG. 8 illustrates a bow loading system and the motion restrictor device in the advanced position as seen from the side.

In FIG. 8, the motion restrictor device 1 have been positioned, by the actuator arrangement 8, 9, into the advanced position, wherein the restrictive surface 4 and/or the restrictor areas 5, 5' contacts the hose bridle 15, 15' such that the first restrictor area 5 restricts a first bridle 15 and the second restrictor area 5' restricts a second bridle 15'. In this position, the effective length of the hose bridle 15, 15' holding the free hanging coupling head 12, is shortened form an initial length from the sheaves 23 to the coupling head 12, to a new shortened free hanging length running from the motion restrictor device 1 to the coupling head 12. This results in less relative motion between the coupling head 12 and coupling part 11 if the vessel is subjected to waves, then if the effective length of the free hanging cables were longer.

Figure 9:
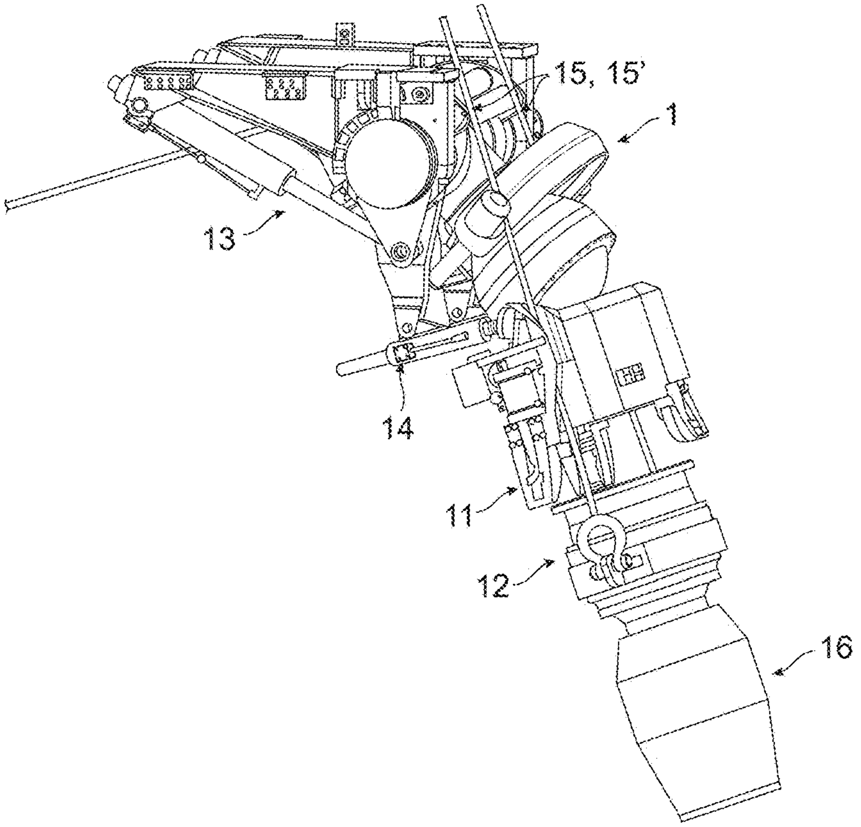
FIG. 9 illustrates a bow loading system and the motion restrictor device as seen from the side.

In FIG. 9, the first rotational means and/or the second rotational means 14, which can be articulated by the remotely controlled drive 23 system, have positioned the coupling part 11 in line with the coupling head 12. To aid in the alignment during this face, the coupling part 11 might comprise a set of a second motion restrictive members 14 in the form of forward opened channels or notches in the coupling part 11.

Figure 10:
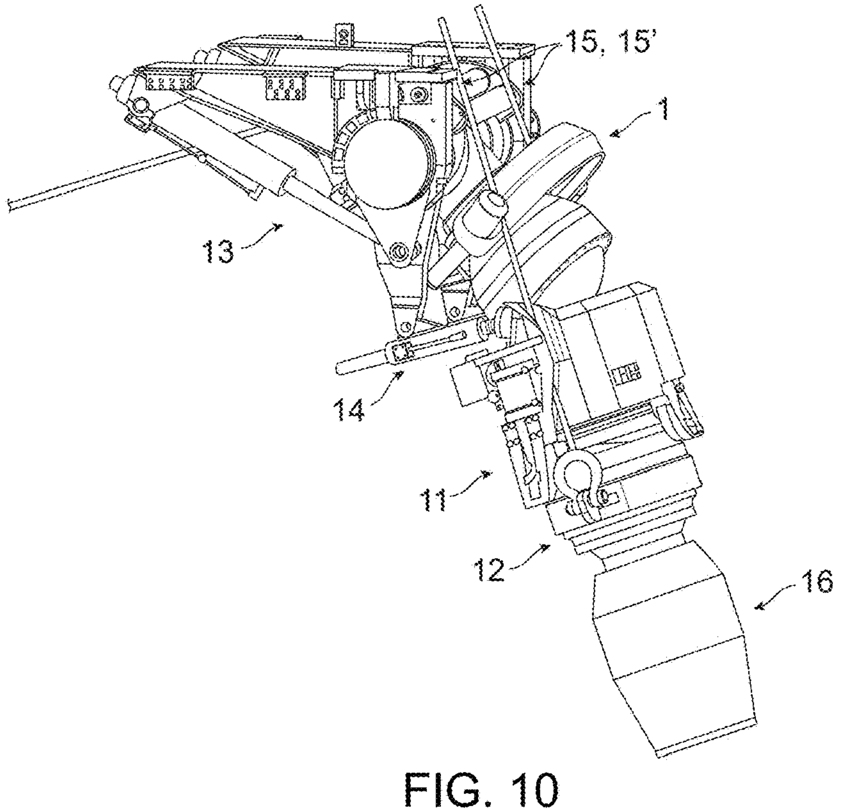
FIG. 10 illustrates a bow loading system and the motion restrictor device as seen from the side.

In FIG. 10, the coupling head 12 is in contact with the coupling part 11 and the locking means 24 of the coupling part 11 engages and locks into corresponding locking means on the coupling head 12 for a secure connection.

Although specific embodiments of the invention have been described and illustrated herein, it is recognized that modifications and variations may readily occur to those skilled in the art, and consequently, it is intended that the claims be interpreted to cover such modifications and equivalents.

REFERENCE NUMERALS

1 Motion restrictor device
2 First portion of the motion restrictor device
3, 3' Second portion of the motion restrictor device
4 Restrictive surface of the motion restrictor device
5, 5' Restrictor area of the motion restrictor device
6 First extendable member
7 Second extendable member
8 Actuator, first actuator
9 Actuator, second actuator
10 Coupling manifold
11 Coupling part of coupling manifold
12 Coupling head of hose/cable
13 First rotational means
14 Second rotational means
15, 15' Lifting member, bridle, wire
16 Transfer hose, transfer cable
17 Frontmost end of the motion restrictor device
18 First side of the back end of the motion restrictor device
19 Second side of the back end of the motion restrictor device
20 Support frame suspending the coupling manifold
21 Receiving tube segment of the coupling manifold
22 Frame part of the coupling manifold
23 Sheaves, rollers
24 Back end of the motion restrictor device

The invention claimed is:

1. A motion restrictor device adapted for an offshore loading system comprising a coupling manifold, the motion restrictor device comprising;

a first portion, and two second portions protruding from opposite sides of the first portion, wherein;

the first portion comprises a first side and a second side and a substantially arched or angled shape adapted to be at least partly encompassing the offshore loading system, or parts thereof, and;

a restrictive surface on an outside of the first portion, wherein the at least two second portions each comprise a protrusion, to form restriction areas comprised of areas between each respective at least two second portions and at least parts of the restrictive surface, adapted to restrict horizontal movement of a bridle, wherein the device further comprises an actuator arrangement adapted to move the motion restrictor device from a retracted position to an advanced position, perpendicular to a center axis running through at least part of the coupling manifold.

2. The motion restrictor device according to claim 1, wherein the actuator arrangement comprises at least one actuator adapted to be connected to the motion restrictor device and to the offshore loading system, or parts thereof, the coupling manifold or parts thereof, or a part of a vessel.

3. The motion restrictor device according to claim 1, the motion restrictor device further comprising;

a first extendable member pivotably attached to a first side of the motion restrictor device, and a second extendable member pivotably attached to a second side of the motion restrictor device, and a first actuator and;

a second actuator, wherein a first end of the first actuator is adapted to be pivotably attached to the offshore loading system, or parts thereof, and a second end of the first actuator is pivotably attached to the first side of the motion restrictor device or to the first extendable member, and the second actuator is adapted to be pivotably attached to the offshore loading system, or parts thereof, and a second end of the second actuator is pivotably attached to the second side of the motion restrictor device or to the second extendable member.

4. The motion restrictor device according to claim 1, wherein the first portion comprises a frontmost end at a centerline, and extends backwards and outwards to both sides of the centerline towards a back end comprising the first side and the second side, to form the substantially arched or angled shape.

5. The motion restrictor device according to claim 1, wherein the second portions protrude from either side of the centerline and form a bullhorn shape.

6. A load arrangement for connection fluid hoses and/or power cables to or from a vessel, the arrangement comprises an offshore loading system with a coupling manifold, and a motion restrictor device according to claim 1 associated with the offshore loading system and being adapted to restrict horizontal movement of hose bridles.

7. The load arrangement according to claim 6, wherein the offshore loading system comprises the coupling manifold, a coupling part associated with the coupling manifold, a loading hose with a coupling head adapted to mate with the coupling part and at least a hose bridle adapted to hoist the coupling head into mating with the coupling part.

8. The load arrangement according to claim 7, wherein the coupling manifold comprises a first rotational means adapted to rotate the coupling manifold around an horizontal rotational axis, and a second rotational means adapted to articulate the coupling part, and wherein the motion restrictor device is situated around the coupling manifold or parts thereof between the first rotational means and the second rotational means.

9. The load arrangement according to claim 7, wherein the load arrangement further comprises the actuator arrangement attached between the coupling manifold, or parts thereof, and the motion restrictor device, adapted to move the motion restrictor device perpendicular to the center axis running through at least part of the coupling manifold, wherein the motion restrictor device is movable between the retracted position and the advanced position.

10. The load arrangement according to claim 7, wherein a distance between the restrictive areas is greater than a distance between two hose bridles.

11. The load arrangement according to claim 6, wherein the load arrangement further comprises the actuator arrangement attached between the coupling manifold, or parts thereof, and the motion restrictor device, wherein the motion restrictor device is movable between the retracted position and the advanced position.

12. The load arrangement according to claim 11, wherein the coupling manifold comprises a first rotational means adapted to rotate the coupling manifold around an horizontal rotational axis, and a second rotational means adapted to articulate the coupling part, and wherein the motion restrictor device is situated around the coupling manifold or parts thereof between the first rotational means and the second rotational means.

13. The load arrangement according to claim 6, wherein a distance between the restrictive areas is greater than a distance between two hose bridles.

14. A method for restricting movement of a riser bridle during connection to the offshore loading system of claim 6, the method comprising the steps of:

a) hoisting a coupling head of a loading hose, via hose bridles, towards a coupling part;

b) positioning the motion restrictor device, by the actuator arrangement, into the advanced position, wherein the motion restrictor device contacts the hose bridles such that the first restrictor area restricts a first bridle and the second restrictor area restricts a second bridle;

c) positioning the coupling part, by articulating a first and/or a second rotational means, such that the coupling part and coupling head are in line; and d) hoisting the coupling head, by hose bridles, until the coupling head contacts the coupling part.

15. A load arrangement for connection fluid hoses and/or power cables to or from a vessel, the arrangement comprises an offshore loading system, and a motion restrictor device according to claim 1 associated with the offshore loading system and being adapted to restrict horizontal movement of hose bridles.

* * * * *